United States Patent
Raad et al.

[11] Patent Number: 6,076,027
[45] Date of Patent: Jun. 13, 2000

[54] METHOD OF CONTROLLING A VEHICLE ACTIVE TILT CONTROL SYSTEM

[76] Inventors: Joseph Michael Raad, 11030 Burlington Apt 413, Southgate, Mich. 48195; John Allen Oliver, 44825 Kirk Ct., Canton, Mich. 48187-1717; Douglas Scott Rhode, 32743 Hearthstone Rd., Farmington Hills, Mich. 48334; Russell Lee Norton, 6953 Drexel, Dearborn Heights, Mich. 48127; Steven A. Hermann, 1622 Crestview, Canton, Mich. 48188; Jon Roland Watson, 45317 Danbury Ct, Canton, Mich. 48188

[21] Appl. No.: 09/018,159

[22] Filed: Feb. 3, 1998

[51] Int. Cl.$^7$ .......................... G06F 17/00; B60G 17/00
[52] U.S. Cl. .................. 701/38; 701/1; 701/70; 701/71; 280/5.502; 280/5.504; 280/5.507; 280/6.16
[58] Field of Search .................. 701/38, 70, 71, 701/1; 280/124.106, 5.5, 5.502, 5.504, 5.506, 5.507, 6.16

[56] References Cited

U.S. PATENT DOCUMENTS

| | | | |
|---|---|---|---|
| 4,629,212 | 12/1986 | Takizawa et al. | 280/707 |
| 4,903,983 | 2/1990 | Fukushima et al. | 280/707 |
| 4,930,082 | 5/1990 | Harara et al. | 701/38 |
| 5,029,328 | 7/1991 | Kamimura et al. | 701/38 |
| 5,062,657 | 11/1991 | Majeed | 280/707 |
| 5,087,068 | 2/1992 | Fukanaga et al. | 280/707 |
| 5,103,396 | 4/1992 | Hiwatashi et al. | 701/38 |
| 5,390,121 | 2/1995 | Wolfe | 701/38 |
| 5,467,280 | 11/1995 | Kimura | 701/38 |

*Primary Examiner*—William A. Cuchlinski, Jr.
*Assistant Examiner*—Yonel Beaulieu
*Attorney, Agent, or Firm*—Gregory P. Brown

[57] ABSTRACT

A method of controlling a vehicle active tilt control system is provided for increasing the operating efficiency and improving operator/passenger comfort associated with the operation of a motor vehicle having an active tilt control system. The tilt control system includes a stabilizer bar adjustable by a hydraulic actuator which is movable in first and second opposing directions for adjusting vehicle body roll resistance provided by the stabilizer bar, and having a pressure control valve for controlling hydraulic pressure to the actuators. The method includes the following steps: a) obtaining a lateral acceleration magnitude signal; b) comparing the lateral acceleration magnitude signal to a first lateral acceleration threshold; c) enabling the active tilt control system for the vehicle when the lateral acceleration magnitude signal exceeds the first lateral acceleration threshold; d) disabling the active tilt control system for the vehicle when the lateral acceleration magnitude signal is less than the first lateral acceleration threshold; e) comparing the lateral acceleration magnitude signal to a third lateral acceleration threshold; and f) resetting the active tilt control system for the vehicle when the lateral acceleration magnitude signal is less than the third lateral acceleration threshold continuously for at least a predetermined period of time.

14 Claims, 2 Drawing Sheets

METHOD OF CONTROLLING A VEHICLE ACTIVE TILT CONTROL SYSTEM

BACKGROUND OF THE INVENTION

1. Field of the Invention

The present invention relates to a method of controlling a vehicle active tilt control system. More particularly the present invention provides improved operating efficiency and operator/passenger comfort by selectively disabling the system under certain vehicle operating conditions.

2. Background Of The Invention

Automotive vehicles having suspensions are frequently equipped with stabilizer bars to reduce tilt or roll of the vehicle body relative to the suspension during vehicle maneuvers. The stabilizer bar is usually connected between the suspension arms of the vehicle wheels and frame or body structure. When the left and right wheels are in similar positions with respect to the frame or body, the stabilizer bar does not twist and therefore, it is effectively not there. When one wheel passes over a projection or depression in the road surface, or when the vehicle turns and the inside and outside wheels assume considerably different positions with respect to the frame or body, the stabilizer bar is twisted. This twisting motion induces a torsional resilient force for affecting the rolling characteristic of the vehicle and the road surface following characteristic of the vehicle wheels.

It is desirable that the torsional resilient force of the stabilizer bar can be adjusted in accordance with running or traveling conditions of the vehicle. Specifically, it is desirable to reduce the torsional rigidity during straight travel of the vehicle and to increase the torsional rigidity during turning of the vehicle. The reduced torsional rigidity enhances the road surface following characteristic of the vehicle wheels while the increased torsional rigidity enhances the roll characteristic of the vehicle.

Certain vehicle active tilt control systems include front and/or rear stabilizer bars which are adjustable by front and rear hydraulic actuators placed in lieu of the stabilizer bar linkages. The actuators are movable in extension and compression directions for adjusting vehicle body roll resistance provided by the stabilizer bars. A hydraulic pressure source must continuously supply pressurized fluid, controlled by electromechanical devices, to satisfy the hydraulic demand of the actuators. During straight line operation, the hydraulic system and the electromechanical valves consume valuable energy to be able to satisfy a command requiring pressurized hydraulic fluid. Additionally, static hydraulic fluid locked in the actuators provide a nominal value of resistance to suspension movement, which can be negatively perceived by vehicle operators and passengers, either as undesirable noise and ride harshness or ride motion.

It is therefore desirable to provide a method of controlling a vehicle active tilt control system which improves the operating efficiency and operator/passenger comfort through disabling the system under certain vehicle operating conditions.

SUMMARY OF THE INVENTION

The present invention overcomes the above referenced shortcomings of prior art vehicle active tilt control systems by providing method of controlling a vehicle active tilt control system capable of disabling the tilt control system to permit enhanced ride performance and increased vehicle efficiency when the system operates under predetermined operating conditions. The system monitors lateral acceleration and/or vehicle speed to determine when it can disable the system due to vehicle operating conditions.

More specifically, the present invention provides a method of controlling a vehicle active tilt control system having a stabilizer bar adjustable by a hydraulic actuator which is movable in first and second opposing directions for adjusting vehicle body roll resistance provided by the stabilizer bars, and having a pressure control valve for controlling hydraulic pressure to the actuators. The method comprises the steps of: a) obtaining a lateral acceleration magnitude signal; b) comparing the lateral acceleration magnitude signal to a first lateral acceleration threshold; c) enabling the active tilt control system for the vehicle when the lateral acceleration magnitude signal exceeds the first lateral acceleration threshold; d) disabling the active tilt control system for the vehicle when the lateral acceleration magnitude signal is less than the first lateral acceleration threshold; e) comparing the lateral acceleration magnitude signal to a third lateral acceleration threshold; and f) resetting the active tilt control system for the vehicle when the lateral acceleration magnitude signal is less than the third lateral acceleration threshold continuously for at least a predetermined period of time.

It is an advantage of the present invention to provide a more efficient system which provides greater operator and passenger comfort than previously available.

DETAILED DESCRIPTION OF THE PREFERRED EMBODIMENT

Figure 1:
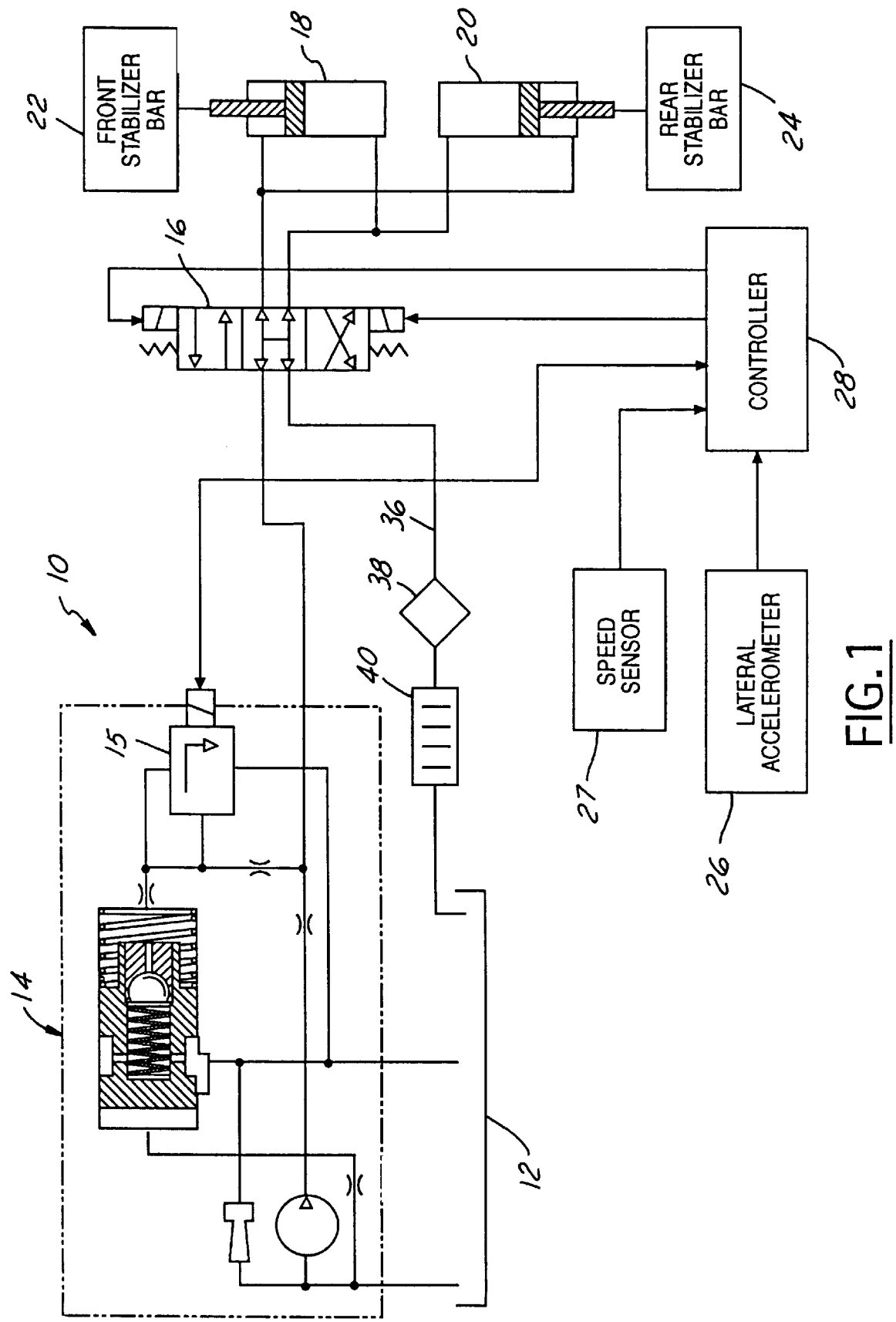
FIG. 1 is a schematically arranged flow diagram of a vehicle active tilt control system with a testing control system in accordance with the present invention.

Referring to FIG. 1, a vehicle active tilt control system 10 is shown in accordance with the present invention. As shown, a hydraulic tank 12 provides hydraulic fluid which is pumped by the pump 14 which includes a variable pressure control valve 15 therein. The pressure control valve within the pump is operative to control hydraulic pressure within the system. Pressurized fluid is accordingly provided from the pump 14 to a directional control valve 16.

The directional control valve 16 selectively directs the pressurized fluid to opposing chambers in the front and rear actuators 18,20 for establishing the direction of movement of the actuators 18,20. The front and rear actuators 18,20 are connected, respectively, to the front and rear stabilizer bars 22,24 in lieu of conventional stabilizer bar linkages. Preferably, the front and rear actuators 18,20 are single rod end double acting actuators. The actuators 18,20 wind up the stabilizer bars 22,24, thus creating the desired force needed to resist body roll during vehicle maneuvers. It should be recognized that the present invention applies to systems including front and or rear actuators with the same operability and benefits.

The vehicle active tilt control system 10 includes a lateral accelerometer 26 which measures the direction and magnitude of lateral acceleration during vehicle maneuvers and a vehicle speed sensor 27 for determining the vehicle speed. A controller 28 is provided for receiving signals from the lateral accelerometer 26 and the speed sensor 27 for controlling the directional control valve 16 and the pressure control valve in the pump 14.

FIG. 1 also shows a fluid return circuit 36, which includes a filter 38 and cooler 40 for returning the hydraulic fluid to the tank 12 from the actuators 18,20.

Based on lateral acceleration from the lateral accelerometer 26 and vehicle speed signals, the pressure control valve within the pump 14 and the directional valve 16 are controlled. Together, these valves determine the pressure (force) and direction (extend or compress) of the actuators 18,20 for winding up the stabilizer bars 22,24.

Figure 2:
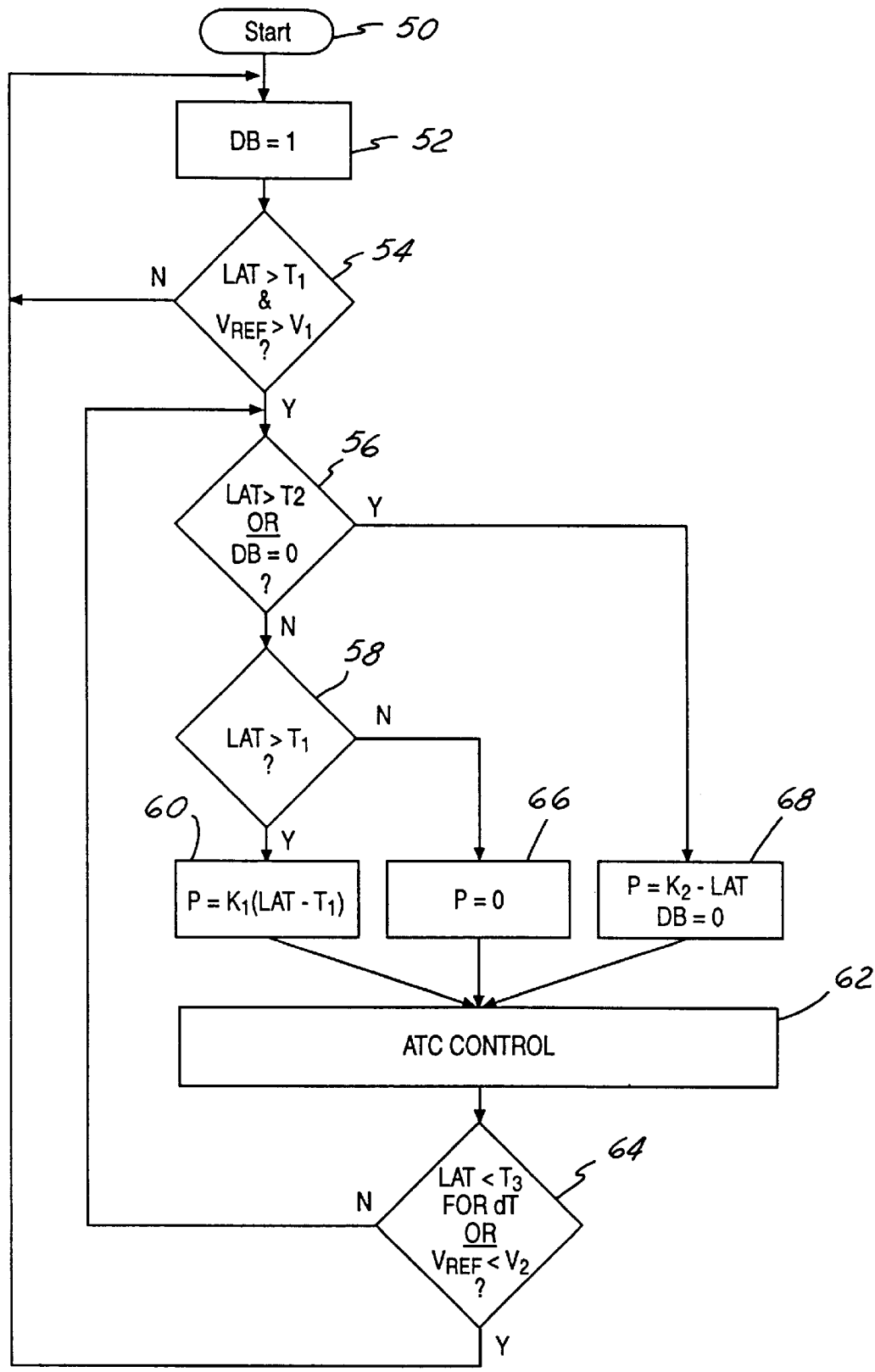
FIG. 2 is a flow diagram of an active tilt control system in accordance with the present invention.

The invention, as described with reference to FIGS. 1 and 2, provides an algorithm for improving the energy efficiency and the operator/passenger comfort achieved when the vehicle equipped with this system is operated down a straight segment of road.

When the vehicle is driven over a straight road and bumpy segment of road, the vehicle equipped with an active tilt control system may try to respond to the small transient lateral accelerations imparted on the vehicle by the bumps and minor corrective steering inputs. In doing so, energy is consumed by the actuation of the pump 14, the pressure control valve therein and the directional control valve such that pressurized fluid is delivered to the actuators. Additionally, as this pressure is applied to the actuators, they tend to resist movement of the suspension, resulting in the operator and passengers of the vehicle feeling an objectionable transient lean as well as hearing increased noise communicated through the stiffened suspension.

In the presently preferred embodiment, the controller 28 of the active tilt control system considers the magnitude and sign of the filtered lateral acceleration signal from the lateral accelerometer 26 to determine how much current to provide the pressure control valve within the pump 14 and to determine which direction to energize the directional control valve 16 for sending pressurized fluid to the appropriate chambers within the actuators 18,20. Specifically, the algorithm provides a method for determining whether or not to actuate the pressure control valve within the pump 14 in response to sensed lateral acceleration and or vehicle speed, with an aim to not opening the pressure control valve or operating the directional control valve 16 under certain conditions to improve energy efficiency of the system and the comfort of the vehicle occupants during substantially straight road travel.

As shown in FIG. 2, when the system is initially powered up, the algorithm begins at start block 50. At that time, the active tilt control system is in a disabled state, that is, the pressure control valve in the pump 14 is closed such that no pressurized fluid is communicated from the pump to the actuators. Additionally, hydraulic fluid in the chambers of the actuators freely flows through the directional control valve 16 to and from the tank 12, thereby effectively disconnecting the stabilizer bars. At block 52, the controller sets various system parameters, as well as setting a deadband flag, DB equal to 1, to indicate that the system will be operating with the benefit of a predetermined deadband enabled.

The controller proceeds to block 54, where it compares the magnitude of the filtered lateral acceleration signal, LAT, to a first lateral acceleration threshold, $T_1$, and the vehicle speed signal, $V_{ref}$, to a first vehicle speed threshold, $V_1$. If the lateral acceleration signal and the vehicle speed signal are equal to or exceed these predetermined thresholds, the active tilt control system will be enabled and the controller will continue to block 56 and if not, the system will remain disabled until the conditions are satisfied. It should be noted that $T_1$ and $V_1$ are system performance tuning parameters, which in the presently preferred embodiment take the values of 0.1 g and 5 mph, respectively.

At block 56, the controller compares the lateral acceleration signal, LAT, to a second threshold, $T_2$, which is also a tuning parameter that indicates the vehicle is operating under higher lateral acceleration loading and requires a different control strategy. In the presently preferred embodiment, $T_2$ has a value of 0.3 g. If the lateral acceleration signal does not exceed $T_2$, the controller proceeds to block 58. At block 58 the controller compares the lateral acceleration signal, LAT, to the first threshold, $T_1$, and if the LAT is greater than $T_1$, the controller proceeds to block 60 and if it is less than $T_1$, the controller proceeds to block 66. At block 60, the controller determines the hydraulic pressure control signal, P, according to the following relationship:

$$P = K_1 (LAT - T_1)$$

where $K_1$ is a tunable system parameter, presently having the value of 1500 and $T_1$ is a system parameter described above.

From block 60 the controller proceeds to block 62, where the controller commands the pressure control valve in the pump 14 and the directional control valve 16 to provide the pressure to the actuators 18, 20 in response to the pressure control signal, P. Via block 64, the controller will continue active tilt control by returning to block 56 until either the lateral acceleration signal, LAT, drops below a third lateral acceleration threshold, $T_3$, for a predetermined period of time, dT, or the vehicle speed signal, $V_2$, drops below a second vehicle speed threshold, $V_2$, at which point the system resets itself as if the vehicle were just started, returning to block 52.

Returning to block 58, if LAT is less than $T_1$, the controller proceeds to block 66 where the deadband operates to save energy by setting the pressure control signal, P, equal to zero. The controller proceeds through blocks 62 and 64 as described above.

Returning now to block 56, if the lateral acceleration signal, LAT, exceeds the second threshold, $T_2$, the controller proceeds to block 68 where the pressure control signal, P is set according to the following relationship:

$$P = K_2 * LAT$$

where $K_2$ is also a tunable system parameter, presently having the value of 1000. Additionally, the controller sets the deadband flag, DB, equal to 0, to indicate that the system will be operating without the benefit of deadband control due to the nature of the current operating conditions and the desirability to have a very responsive system. The deadband control will effectively be disabled as a result of the test in block 56 for this condition and will remain so until the system is reset via block 64. The controller proceeds through blocks 62 and 64 as described above.

By operating with the deadband enabled, the system will conserve energy by allowing the pump to do less work when the system is within the predetermined deadband range and by not actuating the electromechanical pressure and directional control valves. Additionally, while the system is in deadband operation, the stabilizer bars are effectively removed from the suspension by placing the directional control valve in its neutral position, which allows fluid to flow to the tank or between the chambers of the actuators through a shunt, allowing a softer, quieter ride than is possible with stabilizer bars connected.

The flexibility provided by the above described active tilt control system provides several opportunities for enhanced customer satisfaction. For instance, the system could readily equipped with an operator adjustable control system allowing the operator to adjust the gains, $K_1$ and $K_2$ as well as the deadband width, $T_1$ and $T_2$, to allow an operator tuned vehicle. These parameters could also be automatically varied based on further sensed vehicle operating conditions. For instance, the system could sense off-road operation by noting that the vehicle is operating in a driver selected low gear range and correspondingly open up the deadband width, $T_1$ and $T_2$, for improved off-road capability. Finally, the system could also infer hydraulic fluid temperature from the varying resistance of the coils in the electromechanical valves and either operate the valves to heat the fluid or anticipate performance differentials in the actual control signal computation.

Various modifications and variations such as these will no doubt occur to those skilled in the art to which this invention pertains. Yet another example includes using only the lateral acceleration signal or only the vehicle speed signal for controlling the system described above. These and all other variations which basically rely on the teachings by which this disclosure has advanced the art are properly considered within the scope of this invention as defined by the appended claims.

We claim:

1. A method of controlling a vehicle active tilt control system having a stabilizer bar adjustable by a hydraulic actuator which is movable in first and second opposing directions for adjusting vehicle body roll resistance provided by the stabilizer bar, and having a pressure control valve for controlling hydraulic pressure to the actuator, the method comprising:

obtaining a lateral acceleration magnitude signal;

comparing said lateral acceleration magnitude signal to a first lateral acceleration threshold;

enabling the active tilt control system for the vehicle when said lateral acceleration magnitude signal exceeds said first lateral acceleration threshold;

disabling the active tilt control system for the vehicle when said lateral acceleration magnitude signal is less than said first lateral acceleration threshold;

comparing said lateral acceleration magnitude signal to a third lateral acceleration threshold; and resetting the active tilt control system for the vehicle when said lateral acceleration magnitude signal is less than said third lateral acceleration threshold continuously for at least a predetermined period of time.

2. The method of claim 1, further comprises:

obtaining a vehicle speed signal;

comparing said vehicle speed signal against a first vehicle speed threshold; and enabling the active tilt control system for the vehicle when said vehicle speed signal exceeds said first vehicle speed threshold.

3. The method of claim 2, wherein the active tilt control system for the vehicle is enabled when both said lateral acceleration magnitude signal exceeds said first lateral acceleration threshold and said vehicle speed signal exceeds said first vehicle speed threshold.

4. The method of claim 2, further comprises:

comparing said vehicle speed signal against a second vehicle speed threshold; and resetting the active tilt control system for the vehicle when said vehicle speed signal is less than said second vehicle speed threshold.

5. The method of claim 1, further comprises:

comparing said lateral acceleration magnitude signal to a second lateral acceleration threshold while the active tilt control system is enabled; and disregarding said disable command based upon said lateral acceleration magnitude signal being less than said first lateral acceleration threshold when said lateral acceleration magnitude signal exceeds a second lateral acceleration threshold until the active tilt control system is reset.

6. The method of claim 1, further comprises generating a pressure control signal using a first relationship and generating said pressure control signal using a second relationship after said lateral acceleration magnitude signal exceeds a second lateral acceleration threshold.

7. A method of controlling a vehicle active tilt control system having a stabilizer bar adjustable by a hydraulic actuator which is movable in first and second opposing directions for adjusting vehicle body roll resistance provided by the stabilizer bar, and having a pressure control valve for controlling hydraulic pressure to the actuator, the method comprising:

obtaining a vehicle speed signal;

obtaining lateral acceleration magnitude signal;

comparing said lateral acceleration magnitude signal to a first lateral acceleration threshold;

comparing said vehicle speed signal against a first vehicle speed threshold;

enabling the active tilt control system for the vehicle when said lateral acceleration magnitude signal exceeds said first lateral acceleration threshold;

enabling the active tilt control system for the vehicle when said vehicle speed signal exceeds said first vehicle speed threshold;

generating a disable command to disable the active tilt control system for the vehicle when said lateral acceleration magnitude signal is less than said first lateral acceleration threshold;

comparing said lateral acceleration magnitude signal to a third lateral acceleration threshold; and resetting the active tilt control system for the vehicle when said lateral acceleration magnitude signal is less than said third lateral acceleration threshold continuously for at least a predetermined period of time.

8. The method of claim 7, wherein the active tilt control system for the vehicle is enabled when both said lateral acceleration magnitude signal exceeds said first lateral acceleration threshold and said vehicle speed signal exceeds said first vehicle speed threshold.

9. The method of claim 7, further comprises:

comparing said vehicle speed signal against a second vehicle speed threshold; and resetting the active tilt control system for the vehicle when said vehicle speed signal is less than said second vehicle speed threshold.

10. The method of claim 7, further comprises:

comparing said lateral acceleration magnitude signal to a second lateral acceleration threshold while the active tilt control system is enabled; and disregarding said disable command based upon said lateral acceleration magnitude signal being less than said first lateral acceleration threshold when said lateral acceleration magnitude signal exceeds a second lateral acceleration threshold until the active tilt control system is reset.

11. The method of claim 10, further comprises generating a pressure control signal using a first relationship and generating said pressure control signal using a second relationship after said lateral acceleration magnitude signal exceeds said second lateral acceleration threshold.

12. A method of controlling a vehicle active tilt control system having front and rear stabilizer bars adjustable by front and rear hydraulic actuators which are movable in first and second opposing directions for adjusting vehicle body roll resistance provided by the stabilizer bars, and having a pressure control valve for controlling hydraulic pressure to the actuators, the method comprising:

obtaining a vehicle speed signal;

obtaining lateral acceleration magnitude signal;

comparing said lateral acceleration magnitude signal to a first lateral acceleration threshold;

comparing said vehicle speed signal against a first vehicle speed threshold;

enabling the active tilt control system for the vehicle when both said lateral acceleration magnitude signal exceeds said first lateral acceleration threshold and said vehicle speed signal exceeds said first vehicle speed threshold;

generating a disable command to disable the active tilt control system for the vehicle when said lateral acceleration magnitude signal is less than said first lateral acceleration threshold;

comparing said lateral acceleration magnitude signal to a second lateral acceleration threshold while the active tilt control system is enabled; and disregarding said disable command based upon said lateral acceleration magnitude signal being less than said first lateral acceleration threshold when said lateral acceleration magnitude signal exceeds said second lateral acceleration threshold until the active tilt control system is reset;

comparing said lateral acceleration magnitude signal to a third lateral acceleration threshold; and resetting the active tilt control system for the vehicle when said lateral acceleration magnitude signal is less than said third lateral acceleration threshold continuously for at least a predetermined period of time.

13. The method of claim 12, further comprises:

comparing said vehicle speed signal against a second vehicle speed threshold; and resetting the active tilt control system for the vehicle when said vehicle speed signal is less than said second vehicle speed threshold.

14. The method of claim 12, further comprises generating a pressure control signal using a first relationship and generating said pressure control signal using a second relationship after said lateral acceleration magnitude signal exceeds said second lateral acceleration threshold.

* * * * *